United States Patent
Barnes et al.

(10) Patent No.: US 6,270,736 B1
(45) Date of Patent: Aug. 7, 2001

(54) IDENTITY PRESERVED OILSEED MILL

(75) Inventors: Warren D. Barnes, Cordova; Rodney L. Frazier, Memphis, both of TN (US)

(73) Assignee: Frazier, Barnes Research LLC, Memphis, TN (US)

( * ) Notice: Subject to any disclaimer, the term of this patent is extended or adjusted under 35 U.S.C. 154(b) by 0 days.

(21) Appl. No.: 09/235,113

(22) Filed: Jan. 21, 1999

(51) Int. Cl.$^7$ .................................................. B01D 11/02
(52) U.S. Cl. ........................ 422/268; 99/516; 210/511; 210/634; 422/261; 422/269
(58) Field of Search .................................. 422/261, 268, 422/269; 210/634, 511; 99/516

(56) References Cited

U.S. PATENT DOCUMENTS

| | | | |
|---|---|---|---|
| 3,809,538 | * 5/1974 | Duchateau | 422/268 |
| 4,213,941 | * 7/1980 | Boomer | 422/268 |
| 4,376,052 | * 3/1983 | Gessler | 422/268 |
| 4,619,053 | 10/1986 | Schumacher | 34/12 |
| 4,622,760 | 11/1986 | Schumacher | 34/65 |
| 4,857,279 | * 8/1989 | Kawamata et al. | 422/268 |
| 5,174,433 | 12/1992 | Moser | 198/734 |

OTHER PUBLICATIONS

InterSystems Self Cleaning Operational Brochure (3 pages), No date available.

Typical Crown/Schumacher Counterflow DTDC Brochure (2 pages), No date available.

* cited by examiner

*Primary Examiner*—Krisanne Thornton
(74) *Attorney, Agent, or Firm*—Fish & Richardson P.C., P.A.

(57) ABSTRACT

A method for processing two or more oilseeds includes the steps of providing a first oilseed type and a second oilseed type, processing the first oilseed type to extract a first oilseed product from the first oilseed type, creating a gap in the flow of the first oilseed type, ending the gap by starting the flow of the second oilseed type, and processing the second oilseed type to extract a second oilseed product from the second oilseed type. The gap being effective for preventing substantial commingling of the first oilseed product and the second oilseed product. The method is useful for processing identity preserved oilseeds and genetically modified oilseeds. Product commingling is reduced or eliminated so that the identity preserved products retain their added value. The method for processing oilseeds can be implemented in an oilseed mill by modifying aspects of the processing plant such as the oilseed extractors, desolventizers and material handling equipment.

24 Claims, 7 Drawing Sheets

IDENTITY PRESERVED OILSEED MILL

FIELD OF THE INVENTION

The invention relates to a method and apparatus for processing multiple oilseeds in the same facility. In particular, the invention relates to a method for processing identity preserved oilseeds.

BACKGROUND OF THE INVENTION

Oilseed commodities such as soybeans, sunflowers, and canola are processed into both an oil product and a meal product. Often an oil-processing plant will only process one oilseed type, for example, only soybeans or only sunflowers. In processing plants that process one seed type, incoming oilseed commodities are often stored together prior to processing. Historically, these practices were cost efficient because the plant would typically produce one product type.

There are processing plants that process more than one oilseed type, e.g., both soybeans and sunflowers. These plants are commonly referred to as "switch plants." Switch plants are typically large in scale, processing on the order of 2400 tons of seed per day. Switching from one commodity to another in a switch plant is a substantial undertaking that often requires ceasing oilseed processing altogether. During the down time, holding bins, conveyors, augers, processors and product holding areas are cleaned of the previous oilseed type that tends to "hang-up" in the processing equipment. Such cleaning steps are taken to minimize commodity commingling. Shutting down an entire processing plant is both time consuming and expensive.

Alternatively, a switch plant continues operating and simply starts processing the next oilseed type without taking cleaning steps to minimize commodity commingling. In this instance, processors simply accept the fact that for a certain amount of time following the switch, the oilseed products will contain a mixture of the previous and current oilseed type characteristics. The resulting commingled products are then sold at a reduced price. The commingled oilseed products are referred to as flush products, i.e., flush oil and flush meal. On average, conventional processing plants produce flush oilseed products equalling about 3.5% of the total oilseed product produced when switching from processing a first oilseed type to processing a second oilseed type. For example, if an average processing run was 72 hours long, the processing plant would produce products for about 2.5 hours after switching from the first oilseed type to the second oilseed type unless the processing plant was shut down and the first oilseed type was cleaned out from the processing equipment. Switching without a shut down can be cost effective when running large batches and limiting the number of times the plant switches.

Conventional oil extraction methods and equipment are designed to produce a fungible commodity, e.g., all soybean meals and soybean oils would be considered the same and could be substituted with another soybean meal or oil. An increasing number of farmers now grow specialty oilseed types, e.g., genetically modified oilseeds (GMO's) including corn, soybean, sunflower, and canola seed produced by transgenic plants. Specialty oilseeds have unique features that set them apart from traditional oilseeds. For example, a particular oilseed may produce seeds with increased concentrations of a desired oil component, or produce large quantities of a valuable nutrient or amino acid. When processed, these specialty oilseeds can produce unique end products that are referred to as identity preserved (IP) products. The oils and meal extracted from IP products can demand a higher price as long as product identity is preserved. In other words, identity preserved oilseed products are not fungible or interchangeable. As a result, there is a need for commercial-scale and cost-effective methods for processing oilseeds that produce IP products and for processing smaller batches of different commodities in the same plant.

SUMMARY OF THE INVENTION

A method for processing two or more oilseeds sequentially is disclosed herein. Processing plants that implement methods for processing two or more oilseeds sequentially are also disclosed.

In one aspect, a method for processing two or more oilseeds includes the steps of 1) providing a first oilseed type and a second oilseed, 2) processing the first oilseed to obtain a first oilseed product from the first oilseed, 3) creating a gap in the flow of the first oilseed type, 4) ending the gap by starting the flow of the second oilseed type, and 5) processing the second oilseed type to obtain a second oilseed product from the second oilseed type. Gaps are sufficient and effective for preventing substantial commingling of the first oilseed product and the second oilseed product. In one embodiment, the gap is sufficient and effective for preventing substantial commingling of the first oilseed type and the second oilseed type. In various embodiments, the methods and apparatuses of the present invention are sufficient and effective for reducing the production of flush products to levels less than about 1%, less than about 0.5%, or less than about 0.1% of the total oilseed product output.

In certain embodiments, the methods can be used to process identity preserved oilseeds including without limitation situations wherein the first and the second oilseed are different species, the first oilseed is a genetically modified oilseed, or the second oilseed is a genetically modified oilseed.

In certain embodiments, the time period length of the gap is less than about 60 minutes. In other embodiments, the gap ranges from about 5 minutes to about 60 minutes, is less than about 30 minutes, or ranges from about 15 minutes to about 30 minutes. In another embodiment, the gap is created by temporarily stopping the flow of the first oilseed type.

In other embodiments, processing steps used in the methods further include one or more of the steps of: i) flaking the oilseed type to produce oilseed flakes, ii) transporting the oilseed flakes to an extractor, or iii) extracting an oilseed product from the oilseed flakes in the extractor. At least a portion of the oilseed flakes resulting from processing the first oilseed type and at least a portion of the oilseed flakes resulting from processing the second oilseed type may be present in the extractor concurrently when the additional processing steps are implemented. Additionally, oilseed flakes resulting from processing the first oilseed type and the oilseed flakes resulting from processing the second oilseed type do not substantially commingle.

In certain embodiments, processing methods incorporate the additional steps of sizing and cracking individual oilseed types. In such instances, the cracking is adapted for sized oilseed. Using sizing and cracking steps may decrease the fiber content of a de-oiled meal by at least about 0.6% compared to an equivalent de-oiled meal processed without the sizing and cracking steps.

In certain embodiments, the extractor is a solvent-based extractor. Solvent-based extractors may use solvents such as hexane, isohexane, n-hexane, and isopropyl alcohol. In particular, methods may be implemented that utilize isohexane.

Solvent-based methods often will also include processing steps relating to desolventizing-toasting-drying-cooling vessels (DTDC). DTDC-related steps may include transporting the oilseed flakes to a DTDC, and removing a solvent from the oilseed flakes in a DTDC. At times, at least a portion of the oilseed flakes resulting from processing the first oilseed type and at least a portion of the oilseed flakes resulting from processing the second oilseed type may be present in the DTDC concurrently. Nevertheless, it is envisioned that the oilseed flakes resulting from processing the first oilseed type and the oilseed flakes resulting from processing the second oilseed type do not substantially commingle.

Self-cleaning conveyors may be used during any of the appropriate processing steps for any method or when oilseed is transported from any one processing step to another.

In another aspect, an oilseed processing plant includes one or more of the following aspects: a) a receiving area for receiving a first oilseed type and a second oilseed type, b) an extractor for producing an oilseed product from the first oilseed type and the second oilseed type, c) a storage area for storing the oilseed product. Individual processing units or machines such as the receiving area, the extractor, and the storage area are interconnected by transporting machinery. The processing plant is sufficient and effective for switching from processing a first oilseed type to processing a second oilseed type without a substantial interruption of the processing plant, and without substantial commingling of the first oilseed type and the second oilseed type. In one embodiment, the first oilseed type and the second oilseed type are segregated throughout the processing of the first oilseed type and the second oilseed type. Further, processing plants disclosed herein can effectively implement the above-described methods in all respects.

In other embodiments, the plant can extract oil products and attain extraction efficiencies of at least about 98% of the total oil content of an oilseed.

In certain embodiments, the plant implements the above-described methods. In other embodiments, the plant is automated and is sufficient and effective for processing identity preserved oilseeds.

In certain embodiments, switching from one oilseed to another oilseed can be accomplished by creating a gap in the flow of the first oilseed type and the second oilseed type, wherein the gap is sufficient for preventing substantial commingling of the first oilseed type and the second oilseed type. In other embodiments, the plant may produce a first oilseed product derived from the first oilseed type and a second oilseed product derived from the second oilseed type, and wherein the first oilseed product and the second oilseed product do not substantially commingle.

In other embodiments, the extractor used in the plant is a solvent-based extractor, the plant further including a DTDC, the DTDC being interconnected with the extractor and the storage area by transporting machinery. The extractor may be a countercurrent extractor revolving in the vertical plane.

In other embodiments, the plant may further include an oilseed sizing area interposed between the oilseed receiving area and the extractor, wherein the oilseed sizing area is sufficient for separating an oilseed type into at least two groups of oilseed having different oilseed sizes.

In certain embodiments, the processing plant includes one or more processing steps that a) flake the first oilseed type and the second oilseed type, b) transport oilseed flakes derived from the first oilseed type and oilseed flakes derived from the second oilseed type to the extractor, c) extract an oil from oilseed flakes derived from the first oilseed type thereby producing first oilseed type deoiled flakes, and d) extract an oil from oilseed flakes derived from the second oilseed type thereby producing second oilseed type deoiled flakes. In such embodiments, at least a portion of the oilseed flakes derived from the first oilseed type and at least a portion of the oilseed flakes derived from the second oilseed type may be present in the extractor concurrently and the oilseed flakes resulting from processing the first oilseed type and the oilseed flakes resulting from processing the second oilseed type may not substantially commingle.

In certain embodiments, flakes derived from first and second oilseed types are transported to a DTDC for further processing, and during processing at least a portion of the first oilseed type deoiled flakes and at least a portion of the second oilseed type deoiled flakes generated from the second oilseed flakes are present in the DTDC concurrently, and perhaps the deoiled flakes do not substantially commingle within the DTDC.

In other embodiments, the plant contains an extractor that includes: a) a plurality of flake receiving stations disposed along a conveyor for transporting oilseed flakes between a flake inflow port and a flake outflow port, b) a plurality of solvent inflow ports oriented to contact the oilseed flakes with a solvent, and c) a plurality of miscella outflow ports oriented to accept a miscella from the oilseed flakes, the solvent inflow ports and the miscella outflow ports positioned to transport solvent in a direction opposite the direction of the oilseed flakes. Under certain circumstances, the plurality of solvent inflow ports include a first solvent inflow port and a second solvent inflow port, and wherein the plurality of miscella outflow ports include a first miscella outflow port and a second miscella outflow port, wherein one of the first miscella outflow port and the second miscella outflow port accepts a miscella containing the solvent provided by the first solvent inflow port.

In certain embodiments, the first miscella outflow port is oriented to accept a miscella containing a solvent provided by the second solvent inflow port, and wherein the second miscella outflow port is oriented to accept a miscella containing a solvent provided by the first solvent inflow port. In other embodiments, the orientation of the solvent inflow ports and the miscella outflow ports can be switched from one orientation to another orientation depending on the circumstances.

In other embodiments, gap time periods are varied and in some instances the length of the gap is about equal to the time needed for an oilseed flakes entering the extractor through the flake inflow port to be transported to a position coincident with the first solvent inflow port.

In another aspect, a counterflow oilseed extractor that can be used to implement the above-described methods, in all respects, and be used in the above-described processing plants includes: a) a plurality of flake receiving stations disposed along a conveyor for transporting oilseed flakes between a flake inflow port and a flake outflow port, b) a plurality of solvent inflow ports oriented to contact the oilseed flakes with a solvent, and c) a plurality of miscella outflow ports oriented to accept a miscella exiting the oilseed flakes, wherein the solvent inflow ports and the miscella outflow ports are positioned to transport solvent in a direction opposite the direction of the oilseed flakes.

In one embodiment, the plurality of solvent inflow ports include a first solvent inflow port and a second solvent inflow port, and the plurality of miscella outflow ports include a first miscella outflow port and a second miscella outflow port, wherein one of the first miscella outflow port and the second miscella outflow port accepts a miscella containing the solvent provided by the first solvent inflow port.

In another embodiment, the first miscella outflow port is oriented to accept a miscella containing a solvent provided by the second solvent inflow port, and the second miscella outflow port is oriented to accept a miscella containing a solvent provided by the first solvent inflow port. Typically, the orientation of the solvent inflow ports and the miscella outflow ports can be altered or switched according to the circumstances.

In other embodiments, the first miscella outflow port is disposed proximal the flake inflow port, and the first solvent inflow port disposed proximal the flake outflow port. In another embodiment, the second miscella outflow port is interposed between the first solvent inflow port and the second solvent inflow port. At times, the second solvent inflow port is oriented to provide solvent to about ½ the oilseed flakes. In particular, the extractor may be a countercurrent extractor revolving in the vertical plane, wherein the conveyor has an upper half and a lower half. The first miscella outflow port and the second solvent inflow port may be disposed along the upper half of the extractor.

In other embodiments, the first miscella outflow port is oriented to accept a miscella containing solvent provided by the second solvent inflow port and the second miscella outflow port oriented to accept a miscella containing solvent provided by the first solvent inflow port.

In certain embodiments, the first miscella outflow port and the second miscella outflow port engage segregated miscella storage tanks.

In another aspect, a tray assembly for use in an oilseed flake desolventizing-toasting-drying-cooling vessel includes: a) a circular trays disposed within a flake passageway having a bottom surface, a side surface, and a drop valve, b) a rotating driveshaft positioned in the center of the tray, c) a sweep arm secured to the driveshaft, the sweep arm including a bottom edge disposed proximal the bottom surface and a side edge disposed proximal the side surface, wherein the tray assembly includes a reduced clearance distance interposed between the bottom surface and the bottom edge, the reduced clearance being sufficient for removing flakes from the tray assembly. The tray assembly can be used to implement any of the above-described methods and can be used in any of the processing plants described herein.

In one embodiment, the tray assembly further includes a reduced clearance distance between the side surface and the side edge. In another embodiment, the sweep arm further includes a leading edge having a distal end disposed adjacent the side surface and a proximal end disposed adjacent the drop valve, the leading edge sufficient for directing flakes into the drop valve. In other embodiments, sweep arms are curved, trays have flake level control sensors and/or flake level monitors, and/or clearance distances are reduced. In some embodiments the clearance distance between the bottom surface and the bottom edge is reduced at least about 50% compared to currently available DTDCs. In some embodiments, the clearance distance between the side edges and side surfaces is reduced at least about 75%.

The processing plant is used to process virtually any type of oilseed providing the appropriate type of preparation equipment is installed in the plant. Further, the processing plant can process all commodity types or identity preserved oilseeds sequentially or continuously without significantly impacting either the resulting product characteristics or the product yields due to commingling.

Advantages of the invention include maintaining identity preserved seed segregation when using a common unloading system, minimizing processing material hang-up within the transporting system components, creating automatic processing gaps when processing different seed, tracking individual seed batches throughout processing, and maintaining maximum product yield from identity preserved products. As a result, the increased value of individual identity preserved varieties and the resulting products is preserved by significantly reducing seed and product commingling. Additional advantages of the invention will be apparent from the following description of illustrative embodiments of the invention and from the claims.

DESCRIPTION OF THE PREFERRED EMBODIMENTS

Figure 1:
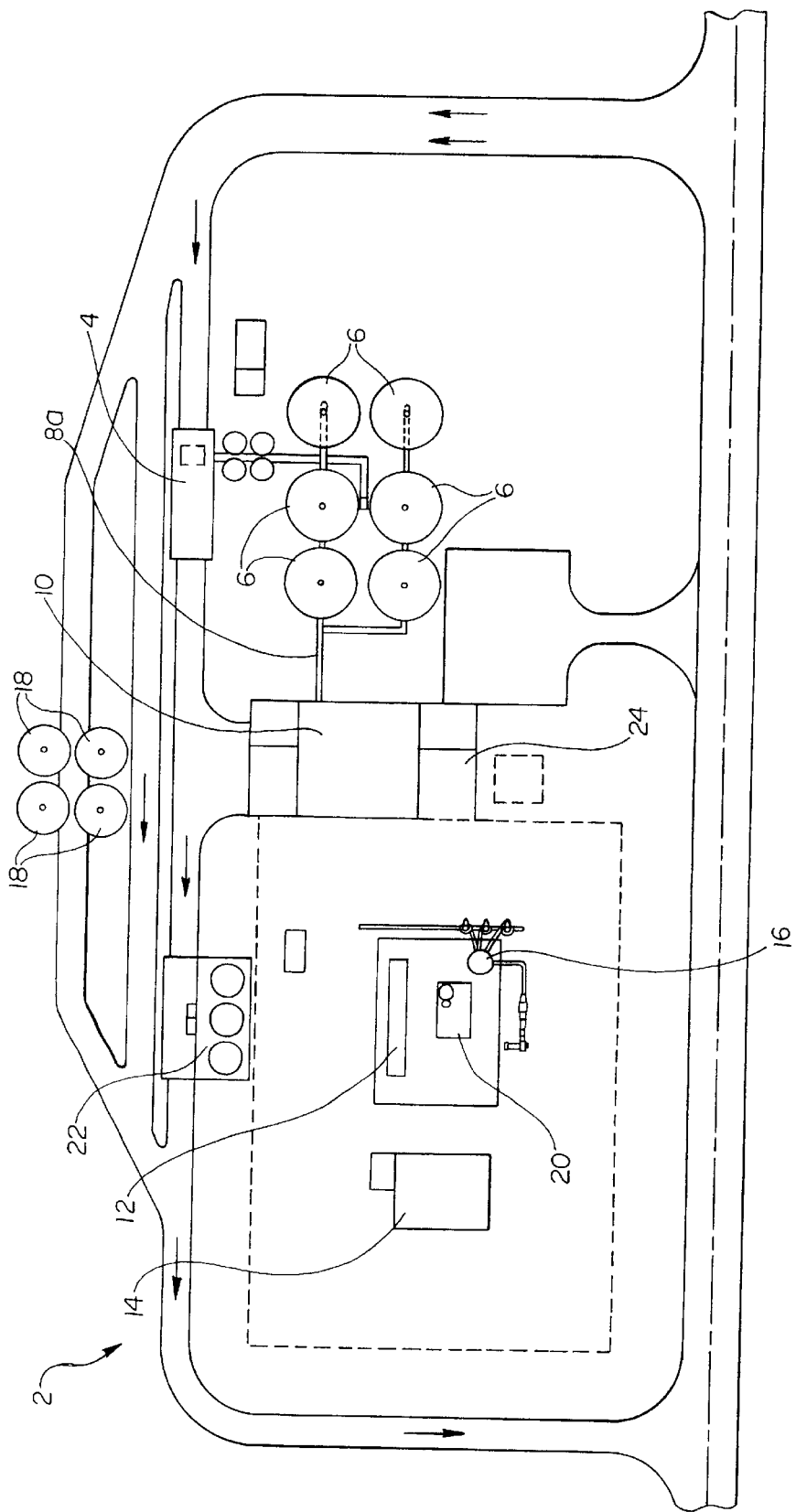
FIG. 1 is a plan view depicting a process facility for processing oilseeds incorporating aspects of the invention.

It has been discovered that oilseed processing plants can be designed to implement a method for sequentially or continuously processing two or more oilseed types without shutting down the entire processing plant and without producing a flush product or producing essentially no flush products, i.e., less than about 0.5% of the products produced in a single run are considered flush products.

The inventors have discovered that creating a temporary gap in the flow of oilseed passing through an oilseed processing plant is sufficient and effective for processing two or more oilseed types sequentially without shutting down the processing plant. A gap may be considered a complete stop of oilseed flow for a specified or predetermined period of time without a concomitant stop in the processing plant. It is to be understood that individual pieces of equipment or groups of equipment such as the operation of conveyors, aspirators, heaters, etc., used in the processing plant may be stopped at various times while implementing the gap. Nevertheless, as a whole, a gap does not require substantial portions or aspects of the processing plant to be idle or shut down while switching from a first oilseed type to a second oilseed type.

Gaps can be created by any convenient manner of arresting the oilseed flow. For example, oilseed exiting a storage area or bin can be stopped for a period of time without stopping other processing plant machinery. As a result, there would be a gap where no oilseed exists in the plant machinery, such gap equal to the period of time that oilseed flow was stopped. This gap then proceeds through each processing step in the processing plant and provides a physical separation between a first oilseed type and a second oilseed type.

The gap creates a void in the oilseed material moving through the processing steps that separates a first oilseed type from a second oilseed type. The void is sufficient and effective for preventing substantial commingling of the first and second oilseed types and for preventing substantial commingling of the oilseed products. Preventing substantial commingling of oilseed products means that both the first and second oilseed products retain their respective identifying characteristics. For example, substantially all of the oil extracted from an oilseed having a high oleic acid content processed immediately before or after a non-high oleic acid variety would be able to be sold as high oleic acid oil, as measured by known industry standards, when substantial commingling of oilseed products is prevented. Thus, nearly all of the oil or meal extracted from an identity preserved oilseed can be sold as an identity preserved product when substantial commingling is prevented. The production of flush products is reduced by preventing substantial oilseed or oilseed product commingling.

Gaps as disclosed and claimed herein are sufficient and effective for reducing and preventing the production of flush products. Accordingly, preventing substantial commingling can diminish the production of flush oil or flush meal to less than about 1% of the total processing run, preferably less than about 0.5%, more preferably less than about 0.1%.

Creating gaps in the oilseed flow is especially useful for processing identity preserved oilseed types, which exact higher selling prices because the oilseed products have characteristics unique to the particular oilseed variety. Identity preserved oilseeds include any oilseed produced by an oilseed variety that has been manipulated to contain or produce an altered level of at least one substance compared to previously sold varieties. Identity preserved oilseed plants can include any oilseed plant variety including soybean, canola, sunflower, rapeseed, nuts, corn, etc. Identity preserved oilseed plants can be produced using any method including conventional plant breeding, genetic engineering, chemical mutagenesis, and physical mutagenesis. For example, a particular oilseed may contain a decreased or elevated oil component, e.g., higher oleic acid content, may contain an altered level of a certain nutrient or amino acid, e.g., lysine methionine tryptophan or any of the other 20 amino acids. The increased value attributed to an identity preserved oilseed is utilized as long as the unique features of the oilseed are maintained.

The particular quality characteristics or parameters required to categorize an oilseed product as an identity preserved product can be agreed upon between the buyer and seller of the oilseed product or determined using the parameters established by the National Oil Producers Association (NOPA) trading rules. NOPA trading rules are available from NOPA, 1255 23rd St, N.W., Washington, D.C. 20037, (202)-452-8040. A flush product is an oilseed product that does not meet the quality characteristics or parameters needed to classify the product as identity preserved or perhaps even as a commodity product. For example, if a second oilseed being processed was an identity preserved oilseed that produced an identity preserved oil, the flush oil would be considered the oil that was: 1) produced by the processing plant after the switch was made from the first oilseed type to the second oilseed type, but 2) could not be categorized as an identity preserved oil.

The gap can be any period of time effective or sufficient for preventing commingling of two oilseed batches. Typically, the gap length is from about 5 minutes to about 60 minutes, preferably about 15 to about 30 minutes. The time length of the gap is dictated, in large part, by the size and type of equipment used in the processing plant and the type of oilseed being processed. The gap should be long enough so that oilseed and oilseed products do not commingle. The gap can be determined empirically. The inventors have determined that producing gaps in the oilseed flow is also sufficient and effective for minimizing oilseed commingling when the gap is combined with other aspects of the invention described herein.

FIG. 1 shows a plan view of one embodiment of an oilseed processing plant 2 incorporating aspects of the invention. Oilseed processing plant 2 is effective for maintaining oilseed segregation throughout the receiving, processing and load-out steps of oil processing. An oilseed processing plant 2 can increase oil extraction efficiency, i.e., the amount of oil recovered compared to the total oil content of an oilseed. Conventional oilseed processing plants are, on average, about 97.3% efficient at removing oil from an oilseed. Oilseed processing plant 2 can achieve oil extraction efficiencies of at least about 98%. Processing plant 2 includes a receiving area 4 for receiving incoming oilseeds. Received oilseeds are transported to and separately stored in one or more segregated storage bins 6. Receiving area 4 and storage bins 6 may be on-site or off-site. Throughout plant 2 oilseed and oilseed products are transported by any suitable machinery. For example, conveyors, augers, pumps and tubing, wagons, or any other types of material handling machinery are used to transport oilseeds and their resulting products throughout plant 2. Transporting machinery is interposed or juxtaposed between processing steps in order to interconnect processing steps positioned at discrete locations. For example, if storage bins 6 are located off-site it may be necessary to truck or trailer oilseeds to another area of plant 2 to begin oilseed extraction processing.

When the oilseed extraction process begins, oilseed is removed from storage bins 6 and transported by conveyor 8*a* or other suitable machinery to an oilseed preparation area 10 for preliminary processing. Methods and machinery for performing the preliminary steps of receiving an oilseed, preparing the oilseed for oil extraction by cleaning, heating, drying, aspirating, cracking, wet milling, dry milling, and/or flaking oilseeds are known to those of ordinary skill in the art. Preliminary processing steps can vary according to the type of oilseed processed. For example, preprocessing steps for soybeans typically include the steps of cleaning, heating, drying, aspirating, cracking, and flaking the oilseed. Corn seed, on the other hand, typically undergoes dry milling or wet milling processes that do not include one or more of the steps used for soybeans, including at least the flaking step.

Flaked or otherwise suitably prepared oilseed is transported to extractor 12 where the oil is removed from the oilseed. Extractor 12 can be any extractor including mechanical presses, extruders, and solvent-based extractors. In FIG. 1, solvent-based extractor 12 is supplied with solvent from solvent storage area 14. Solvent in extractor 12 extracts an oil from the processed oilseed thereby creating a solvent/oil mixture or "miscella" and wet oilseed flakes, which contain a small amount of solvent. Miscella is transported to distillation system 20, which separates the solvent from the oil. The oil is then transported to an oil storage area 22 to await sale and load-out from processing plant 2. Wet flakes are transported to desolventizing-toasting-drying-cooling vessel (DTDC) 16 to undergo solvent removal. Dried flakes exiting DTDC 16 are referred to as oilseed meal. Oilseed meal is sized using known methods and stored in a meal storage area 18 to await sale and load-out from processing plant 2.

Each step undertaken in processing plant 2 can be performed manually. Alternatively, one or more processing steps performed by processing plant 2 can be automated using computers and known automation methods. For example, processing plant 2 could be equipped with conventional remote sensors and controllers. Aspects of processing plant 2 that may be remotely monitored and controlled include all aspects of the plant including electrical motors, mass flow through the plant, processing temperatures, liquid levels, processing pressure, and all other processing parameters. Additionally, conventional sensors can be installed to sample the resulting oil or meal products to facilitate quality control. Processing plant 2 can be equipped with a central control facility 24 for managing the automation. Preferably, the entire plant 2 can be operated from central control facility 24.

Figure 2:
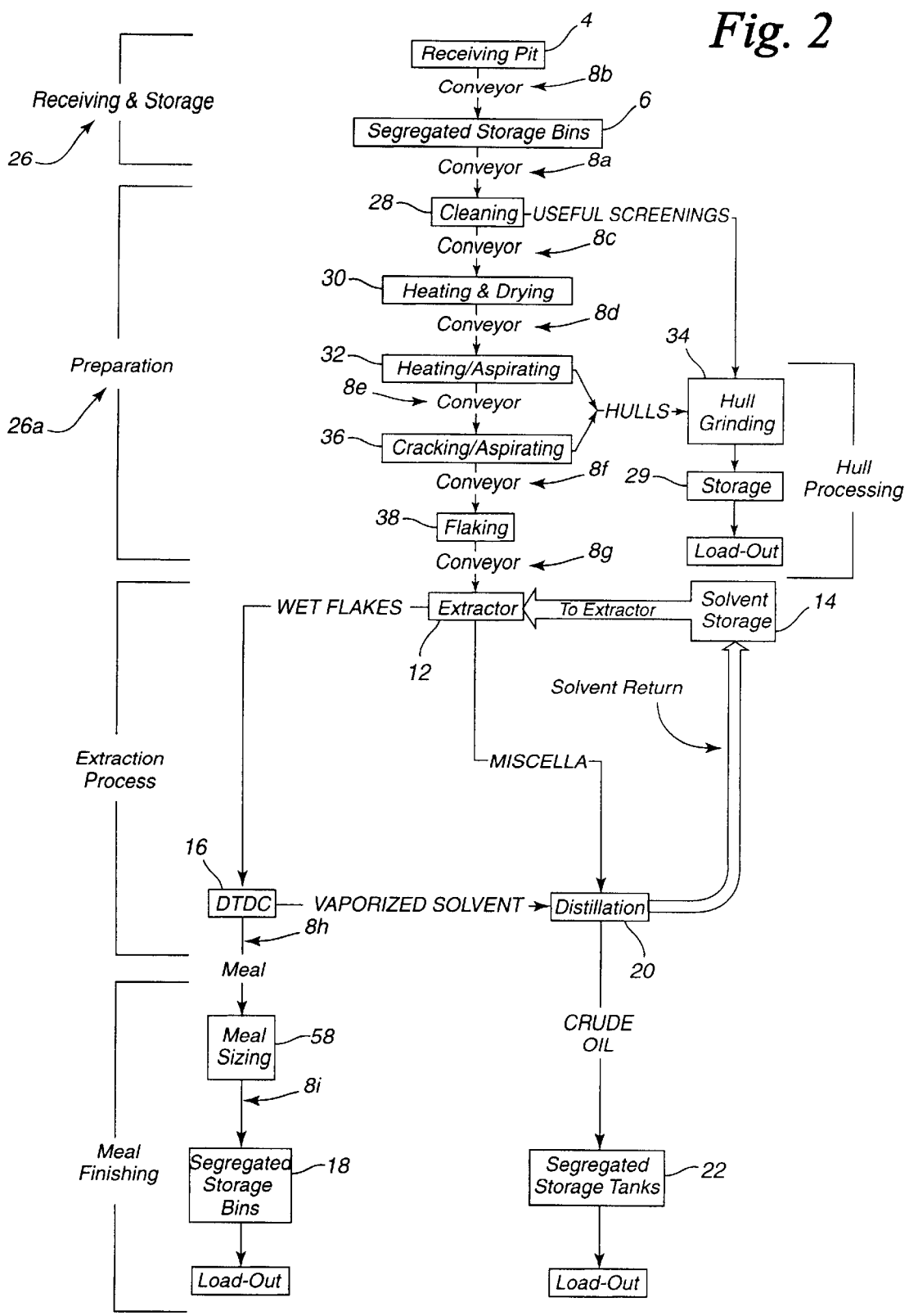
FIG. 2 is a block flow diagram depicting a process for de-oiling oilseeds that can be implemented in the processing plant of FIG. 1.

FIG. 2 shows an embodiment of the processing steps that occur in processing plant 2 when extractor 12 is a solvent-based extractor and the oilseed is amenable to flaking. It is to be understood that the individual designations in FIG. 2 are for illustrative purposes and may refer to more than one piece of equipment or more than a single processing step. As a result of the processing steps, processing plant 2 converts oilseed into oil, oilseed meal, hulls, and overs.

The oil extraction process for more than one oilseed type can proceed as follows. Receiving and storage aspects will be generally returned to by the reference numeral 26. Bulk oilseed arriving by any acceptable method of transportation, such as by rail or truck, is unloaded into oilseed receiving area 4. Oilseed entering receiving area 4 is transported to segregated storage bins 6 via conveyor 8b. A preferred conveyor 8, (collectively referring to conveyors 8a–8i), used throughout processing plant 2 is a self-cleaning drag conveyor that is sufficient and effective for minimizing oilseed hang-up between different types of oilseed arriving at processing plant 2. Oilseed hang-up is the residual oilseed or oilseed product that remains in a piece of equipment when the piece of equipment is otherwise considered empty. Oilseed hang-up can result in commingling of oilseed types when the equipment is used to transport a second oilseed type. Suitable self-cleaning conveyors are available from Intersystems, Inc., Omaha, Nebr. 68317. Useful conveyors can include the conveyors described in U.S. Pat. No. 5,174,433, which is hereby incorporated by reference in its entirety. Other conveyors, augers, or other suitable grain handling machinery may be substituted for conveyor 8 if the other equipment is modified to ensure that oilseed hang-up is minimized. It is to be understood that the importance of oilseed handling equipment is to minimize hang-up using any effective means so that oilseed commingling is minimized.

Storage bins 6 can be constructed using any acceptable material including steel or concrete. Preferably, each storage bin 6 has a sloped or funneled bottom as opposed to a flat bottom. Sloped bottoms facilitate complete oilseed removal from storage bins 6 without requiring manual cleaning. Such a design can minimize commingling of different oilseed types when storage bins 6 later contain a different oilseed. Storage bins 6 can be designed to provide long-term or temporary storage.

Preparation steps 26a useful for processing oilseed into oilseed flakes are known. To initiate processing, self-cleaning conveyor 8a transports oilseed from storage bins 6 to cleaning processor 28. Cleaning processor 28 can vary according to oilseed type. Typically, cleaning processor 28 contains magnets designed to remove metals, scalpers to remove large and heavy materials, and at least one sizing screener. Cleaning processor 28 removes overs from the oilseed. Typical overs include sticks, pods, unwanted grains, metal, rocks and other similar items. Conveyor 8c transports the cleaned oilseed to heating and drying equipment 30 where the oilseed moisture content is adjusted to the proper level needed for further processing.

The size of individual oilseed kernels in a population of oilseeds will vary. Therefore, an alternative embodiment of plant 2 includes a sizer that separates the oilseed according to size creating two or more batches of oilseed. One of the sized oilseed batches continues through plant 2. The other oilseed batch is diverted into storage bins (not pictured) until the first oilseed batch is processed. Then, the other oilseed batch can be processed. Benefits attributed to sizing the oilseed can be achieved by adjusting the cracking equipment 36 (detailed below) used in plant 2. For example, roller mills used to crack the oilseed can have the rollers moved closer together for smaller oilseeds or vice versa. Alternatively, roller mills may have different rollers installed according to the oilseed size. In this way, a more uniform cracking may be achieved. The roller size of the cracking mill can be readily determined empirically. Sizing the oilseed may improve dehulling efficiency, which can lead to a higher protein content and lower fiber content in the resulting oilseed meal. Sizing the oilseed may decrease the fiber content of an deoiled meal by at least about 0.6%.

Dried oilseed is transported using conveyor 8d to heater/aspirator 32 where oilseed hulls are separated from oilseed meats. For example, soybeans hulls can be freed from soybean meat by heating the soybeans to about 190° F. and then aspirating the seeds to remove the separated hulls. Freed oilseed hulls are diverted to a hull grinder 34. Useful overs, typically edible overs, isolated by the cleaning processor 28 may also be added to the hulls for grinding and the individual hulls, screenings, overs, and/or mixtures thereof are stored in storage bins 29. Ground hulls and overs may be used for any purpose. Often the hulls are sold as a solid fuel source for boilers or as an animal feed supplement.

Oilseed meats are conveyed via conveyor 8e or fall by gravity into cracking rollers 36 where the meats are cracked. As indicated above, cracking rollers 36 can be adjustable to facilitate the processing of different sizes. Cracked oilseed meats are subjected to another aspiration to remove any remaining hulls. Cracked oilseed meats are typically about ⅛ the size of the whole oilseed. Cracked oilseed meats are transported via conveyor 8f to flaking system 38 where the cracked meats are compressed into flakes that are about 0.012 inches thick. Other flake thicknesses can also be used.

Flaked oilseed is transported via conveyor 8g to extractor 12. Conventional extractors, in general, are known. Extractor 12 is modified as described herein to achieve the benefits of the present invention. Suitable extractors that can be modified to incorporate aspects of the invention are available from Crown Iron Works Company, Roseville, Minn. 55113. Suitable solvent-based extractors include the extractors available from De Smet, Antwerp, Belgium, and Crown Iron Works.

In particular, known extractors may be modified to enable the extractor to process multiple oilseed types concurrently, concomitantly, or at the same time without substantial commingling of the oilseed or the resulting oilseed products. Extractor 12 can be any extractor type including expeller-type extractors and solvent-based extractors. Solvent-based extractors 12 can be a circular-type extractor that revolves in the vertical plane, with either a deep bed or a shallow bed. Extractor 12 may also be a countercurrent type extractor.

Solvent-based extractor 12 extracts oil by washing oilseed flakes with solvent supplied from solvent storage area 14.

Extractor 12 can be used with any solvent useful for extracting oil including hexane, n-hexane, isohexane, isopropyl alcohol, and other similar solvents. Such solvents are well known. As processing plant 2 switches from processing a first oilseed type to a second oilseed type, extractor 12 may concurrently or concomitantly contain oilseed flakes from two or more oilseed types. Extractor 12 is modified so that first and second oilseed flake types and the resulting miscellas, although present within the extractor at the same time, are physically segregated in extractor 12.

Figure 3:
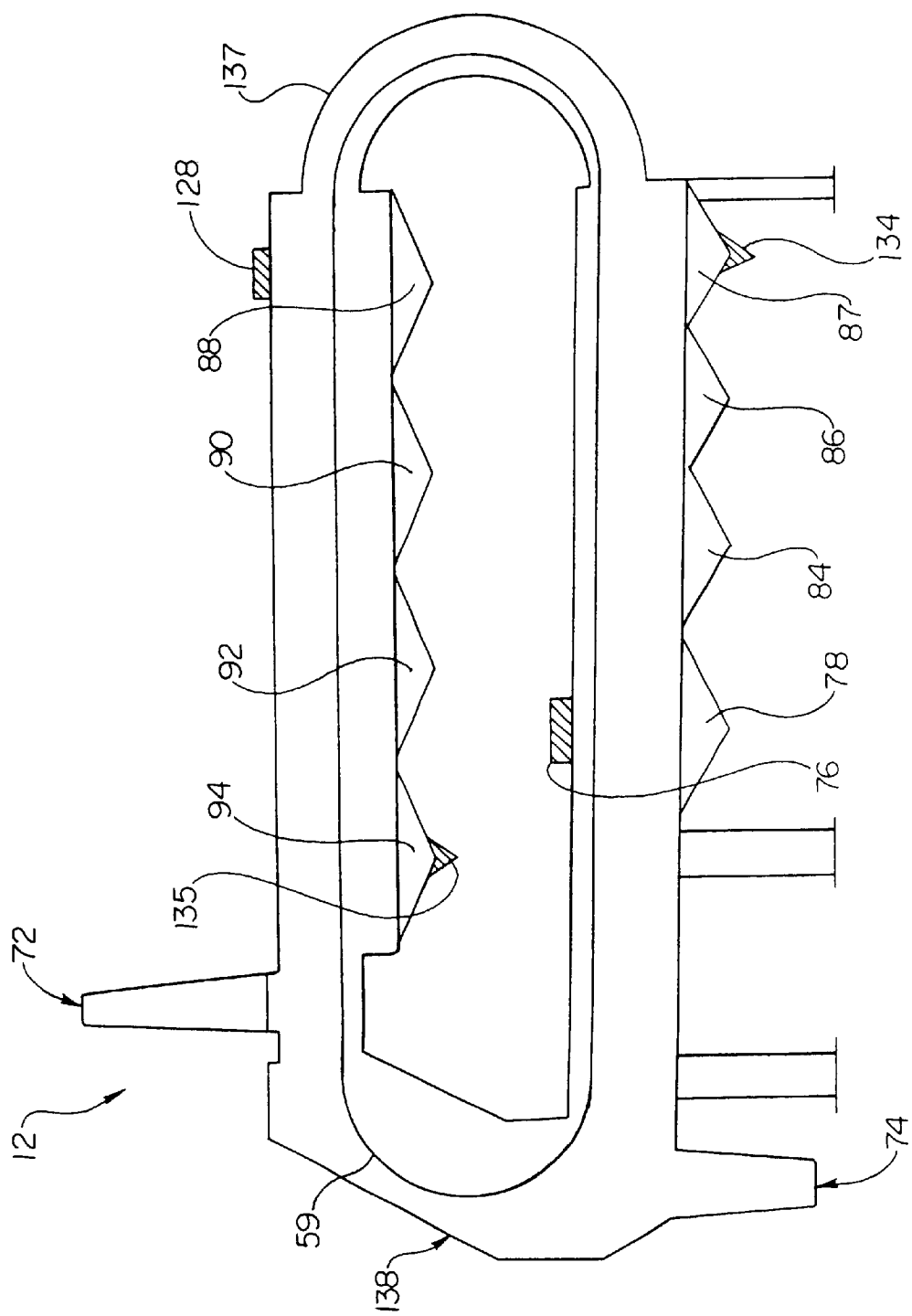
FIG. 3 is a schematic diagram depicting an extractor for extracting oil from an oilseed incorporating aspects of the invention.
Figure 4:
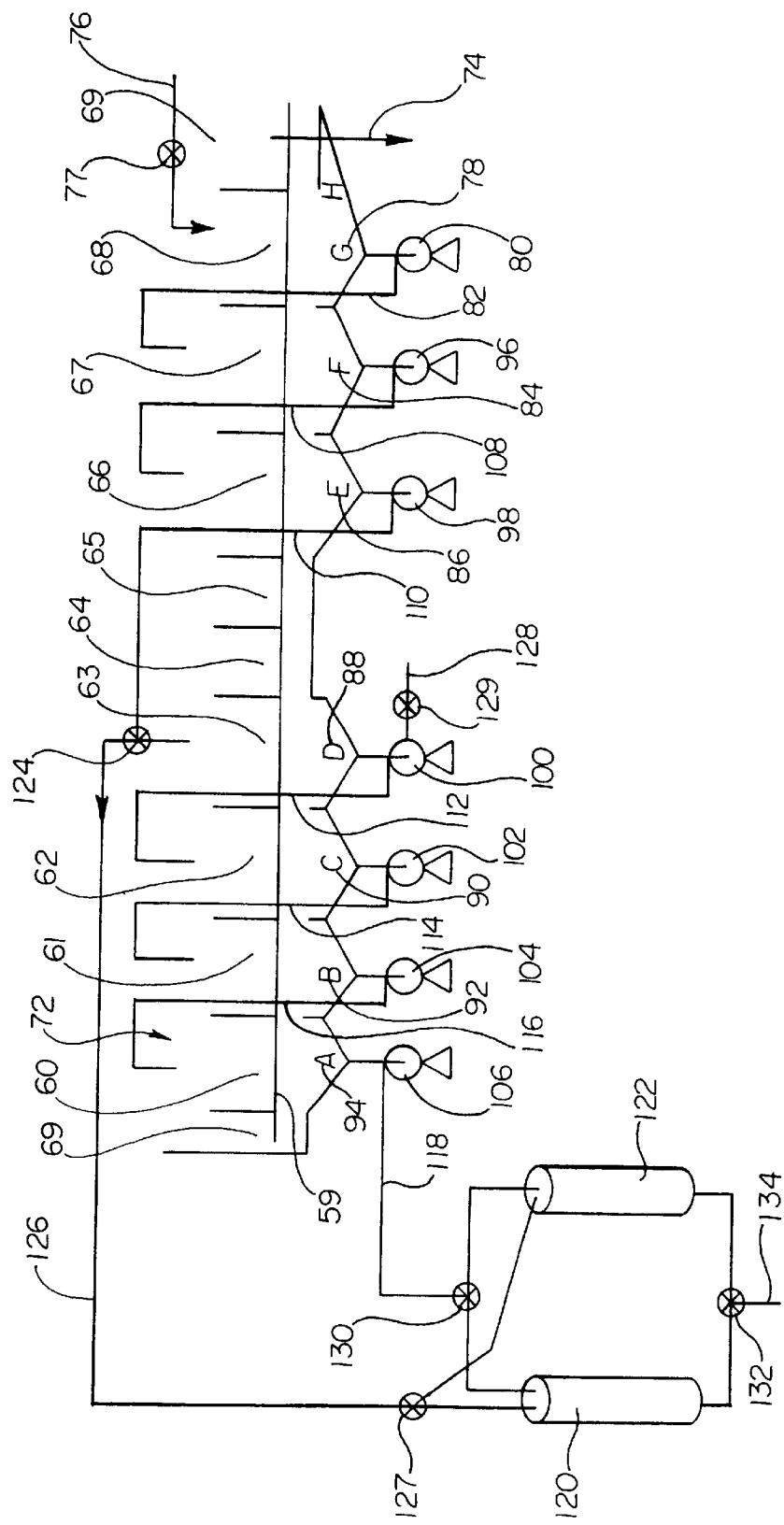
FIG. 4 is a schematic diagram depicting functional aspects of an oilseed extractor incorporating aspects of the invention.

FIGS. 3 and 4 show schematic drawings depicting modifications to a countercurrent solvent-based extractor 12 that facilitate extracting oils from two or more oilseed flake types without commingling of the flakes or the resulting miscella. FIG. 3 shows a counter-current extractor that has flake receiving stations (not pictured) that revolve in the vertical plane. FIG. 4 shows a schematic diagram depicting functional aspects of a solvent-based extractor 12.

Referring to FIG. 3, oilseed flakes enter extractor 12 through inflow flake port 72 and are deposited in flake receiving stations (not pictured) that are secured to conveyor 59. The receiving stations secured to conveyor 59 transport the flakes in a clockwise direction until the flakes exit extractor 12 at outflow flake port 74. A suitable solvent enters extractor 12 through a one or more solvent inflow ports 76, 128. Solvent enters extractor 12 through inflow ports 76 when only one oilseed type is being processed by extractor 12. As will be described in detail below, solvent inflow port 128 is typically used during a processing switch from a first oilseed type to a second oilseed type.

Solvent entering via inflow port 76 passes through the flakes that are coincident with solvent inflow port 76 and extracts oils from the flakes thus becoming a miscella. Miscella collects in miscella receiving station 78. Collected miscella is pumped to a position coincident with an adjacent miscella receiving station. For example, miscella collected in miscella receiving station 78 is pumped to a point coincident with miscella receiving station 84. The miscella contacts additional oilseed flakes before being collected in miscella receiving station 84. The collected miscella then proceeds in the same manner to miscella receiving station 86 and so on with miscella collecting in miscella receiving stations 78, 84, 86, 87, 88, 90, 92, 94. In this way, solvent or miscella travels through extractor 12 in a counter-clockwise direction.

Miscella exits extractor 12 through one or more miscella outflow ports 134, 135. An important aspect of extractor 12 is the complementary use of inflow ports 76, 128 and outflow ports 134, 135. The embodiment of FIG. 3 depicts inflow port 128 and outflow port 135 disposed along the top half of extractor 12 and inflow port 76 and outflow port 134 disposed along the bottom half of extractor 12. Thus, complementary use of the inflow and outflow ports divides extractor 12 into about two equal halves for extracting purposes. Typically, inflow port 76 and outflow port 135 remain open at all times during the operation of extractor 12. Outflow port 134 is opened or active when a gap is near or within extractor 12. Typically, inflow port 128 is open when outflow port 134 is open. When outflow port 134 is open miscella exiting extractor 12 through miscella outflow port 134 will have washed flakes coincident with stations 78, 84, 86, and 87 and miscella exiting extractor 12 through miscella outflow port 135 will have washed flakes coincident with stations 88, 90, 92, and 94. Alternatively, when outflow port 134 and inflow port 128 are closed, miscella exiting miscella receiving station 87 is diverted to wash flakes coincident with miscella receiving station 88 and miscella exiting extractor 12 through miscella outflow port 135 may have washed flakes coincident with stations 78, 84, 86, 87, 88, 90, 92, and 94. The ability of extractor 12 to switch between miscella exiting extractor 12 through miscella outflow port 134 versus miscella continuing through the rest of the miscella receiving stations 88, 90, 92, and 94 is an important aspect of the invention. This switching capability enables extractor 12 to have two oilseed flake types present in extractor 12 at the same time without incurring substantial commingling of oilseed flakes or the resulting miscella.

Sufficient and effective gap lengths can be empirically calculated by determining the number of miscella receiving stations. For example, the gap can be determined to be the period of time it takes conveyor 59 to proceed from a point about coincident with flake inflow port 72 to a point adjacent to the start of turn 137. In FIG. 3, turn 137 begins at a point adjacent to miscella receiving station 88. In this way, extractor 12 can contain first oilseed flakes coincident with miscella receiving stations 78, 84, 86, 87 and second oilseed flakes coincident with miscella receiving stations 88, 90, 92, 94 that are interposed by a gap lacking oilseed flakes. It is to be understood that the size of extractor 12 and thus the relative number of flake stations, miscella stations, solvent ports, and other components of extractor 12 can vary.

Referring to FIG. 4, the effect of a gap in oilseed flow through extractor 12 is described in more detail. Extractor 12 has a circulating conveyor belt 59 containing flake receiving stations 60, 61, 62, 63, 64, 65, 66, 67, 68, 69 (collectively referred to as stations 60–69) moving in a clockwise manner past inflow flake port 72 and outflow flake port 74. oilseed flakes transported from flaking system 38 (not pictured) enter extractor 12 through inflow flake port 72 and are deposited in whichever flake receiving station happens to be coincident with inflow port 72. In FIG. 4, flake receiving station 60 is currently coincident with inflow port 72. Oilseed flakes exit extractor 12 as wet oilseed flakes through outflow port 74.

The extraction process for a first type of oilseed proceeds as follows. Oilseed flakes deposited in stations 60–69 proceed through extractor 12, solvent enters extractor 12 through solvent inflow port 76, which is activated by a valve 77. Solvent passes through the flakes present in flake station 68 and collects in miscella receiving station 78. Solvent extracts oils that are miscible in the solvent from the flakes as the solvent passes through the flakes. Miscella receiving station 78 collects miscella exiting flake station 68 and transports miscella to flake station 67 using a pump 80 and tubing 82. The extraction process continues by repeating solvent transport to the previous stations 60–69 as follows. Solvent receiving stations 84, 86, 88, 90, 92, 94 are equipped with pumps 96, 98, 100, 102, 104, 106 and tubing 108, 110, 112, 114, 116. As a result, there exists a counterflow of miscella passing through the flakes during operation of extractor 12. When miscella enters miscella receiving station 94, pump 106 pumps miscella through tubing 118 to either a storage tank 120 or a storage tank 122. Tubing 118 does not return miscella to extractor 12 and is thus considered a miscella outflow port for extractor 12. Valve 130 is used to direct miscella coming from tubing 118 to either tank 120 or tank 122.

Extractor 12 is equipped with any number of stations 60–69 and their accompanying miscella receiving stations, pumps and tubing. In FIG. 4, flake receiving stations 64, 65, and 69 are not receiving miscella or solvent because stations 64, 65, and 69 represent stations in turns 137, 138 (FIG. 3) of extractor 12. It is to be understood that other designs in which all of stations 60–69 or fewer than all flake receiving stations 60–69 receive miscella or solvent are within the scope of the invention.

The flow of oilseed flakes entering extractor 12 stops when a gap in the oilseed flow between a first oilseed run and a second oilseed run arrives at inflow port 72. When the gap arrives at inflow port 72, the next flake receiving station that becomes coincident with inflow port 72 does not receive oilseed flakes and will remain empty. As long as the gap in the oilseed flow continues, each additional flake receiving station that becomes coincident with inflow port 72 remains empty. For example, while processing a first oilseed, each flake receiving station between inflow port 72 and outflow port 74 contains first oilseed flakes. Then, a gap, which begins about the time flake receiving station 63 becomes coincident with inflow port 72, causes flake receiving station 63 to remain empty. Subsequent receiving stations that become coincident with inflow port 72 remain empty as long as the gap time period has not expired. When the gap time period expires, flakes of the second oilseed start to enter extractor 12 through inflow port 72. At this point, first oilseed flakes, the gap, and second oilseed flakes are concurrently present in extractor 12.

If the gap time period is a four station gap, i.e., a gap time period about equal to the time it takes four flake receiving stations to pass by inflow port 72, and the gap begins as flake receiving station 63 is coincident with inflow port 72, flake receiving stations 63, 62, 61, and 60 will be empty when the second oilseed flakes start to enter extractor 12. It is to be understood that other gap time lengths may be useful, e.g., one station, two station, three station, and so forth.

During the switch from extracting first oilseed flakes processing to extracting second oilseed flakes, miscella flowing through extractor 12 is diverted to prevent a first miscella resulting from extracting the first oilseed flakes from commingling with a second miscella resulting from extracting the second oilseed flakes. For example, using the four station gap described above, one or more valves 124 diverts miscella transported by pump 98 out of extractor 12 when the four station gap is approximately coincident with solvent receiving stations 88, 90, 92, 94. The diverted miscella exiting flake receiving station 66 passes through tubing 126 and into storage tank 120. Tubing 126 does not return the miscella to extractor 12 and thus is considered a miscella outflow port for extractor 12. Miscella passing through tubing 126 is diverted to either storage tank 120 or storage tank 122 by use of valves 127.

At about the same time that valve 124 diverts miscella through tubing 126, a second solvent inflow port 128 is activated by opening valve 129 to provide solvent to pump 100. One or more valves 130 are arranged to deposit the miscella exiting extractor 12 through tubing 118 into either storage tank 120 or storage tank 122 depending on which tank is being used for the first oilseed oil. At this point, the first oilseed flakes and the second oilseed flakes are present in extractor 12, or at the same time. During the stock change over period, i.e., when the gap in the oilseed flow is within extractor 12, solvent enters extractor 12 from inflow port 76 and inflow port 128. After the last flake receiving station containing the first oilseed flakes empties its flakes through outflow port 74, valves 124, 129 are arranged so that miscella exiting miscella receiving station 86 proceeds into the flake receiving station that is coincident with miscella receiving station 88 at that particular time point. As such, miscella flow through extractor 12 is now flowing as it was before the gap arrived at flake inflow port 72. However, valves 130 remain arranged such that the second miscella being pumped by pump 106 enters storage tank 122 instead of storage tank 120 thereby maintaining segregation between the first miscella and the second miscella. In addition, valves 132 are arranged to allow the first miscella stored in tank 120 to proceed through tubing 134 onto further processing or storage until tank 120 is empty. When a third or subsequent oilseed flake batch enters extractor 12, the switching process begins anew.

It is to be understood that second solvent inflow port 128 can be positioned or disposed at alternative locations. For example, port 128 can be positioned above miscella receiving station 88 so that the solvent washes the flakes coincident with station 88. Alternatively, one or more ports 128 can be positioned along the path taken by oilseed flakes in extractor 12 at various locations to compensate for different oilseed types that may require longer washings or different gap lengths. The position and the number of second solvent inflow ports relative to the extractor is determined according to the intended types of oilseed to be processed.

Returning to FIG. 2, miscella exiting extractor 12 may include a mixture of solvent, extracted oil and a small amount of moisture. Miscella is pumped to a distillation apparatus 20 that separates the oil, solvent, and moisture. Distilled solvent is returned to solvent storage area 14 to be reused in extractor 12. Distilled oil is pumped into segregated oil storage tanks 22 where it can remain until final load-out.

Still referring to FIG. 2, wet oilseed flakes exiting extractor 12 are transported to DTDC 16. DTDC 16 can be manufactured as a single unit or as multiple units. Conventional DTDCs are known and are available from Crown Iron Works Company. Conventional DTDCs are also disclosed in U.S. Pat. Nos. 4,619,053 and 4,622,760, which are hereby incorporated by reference in their entirety. Conventional DTDCs such as the Crown/Schumacher design DTDC have a series of trays that hold the flakes during the desolventizing, toasting, drying, and cooling processes. These trays include pre-desolventizing trays, main trays, desolventizing trays, drying trays, sparge steam trays, and any other trays used in a DTDC. Conventional DTDCs can be modified to incorporate aspects of the invention described herein.

Figure 5:
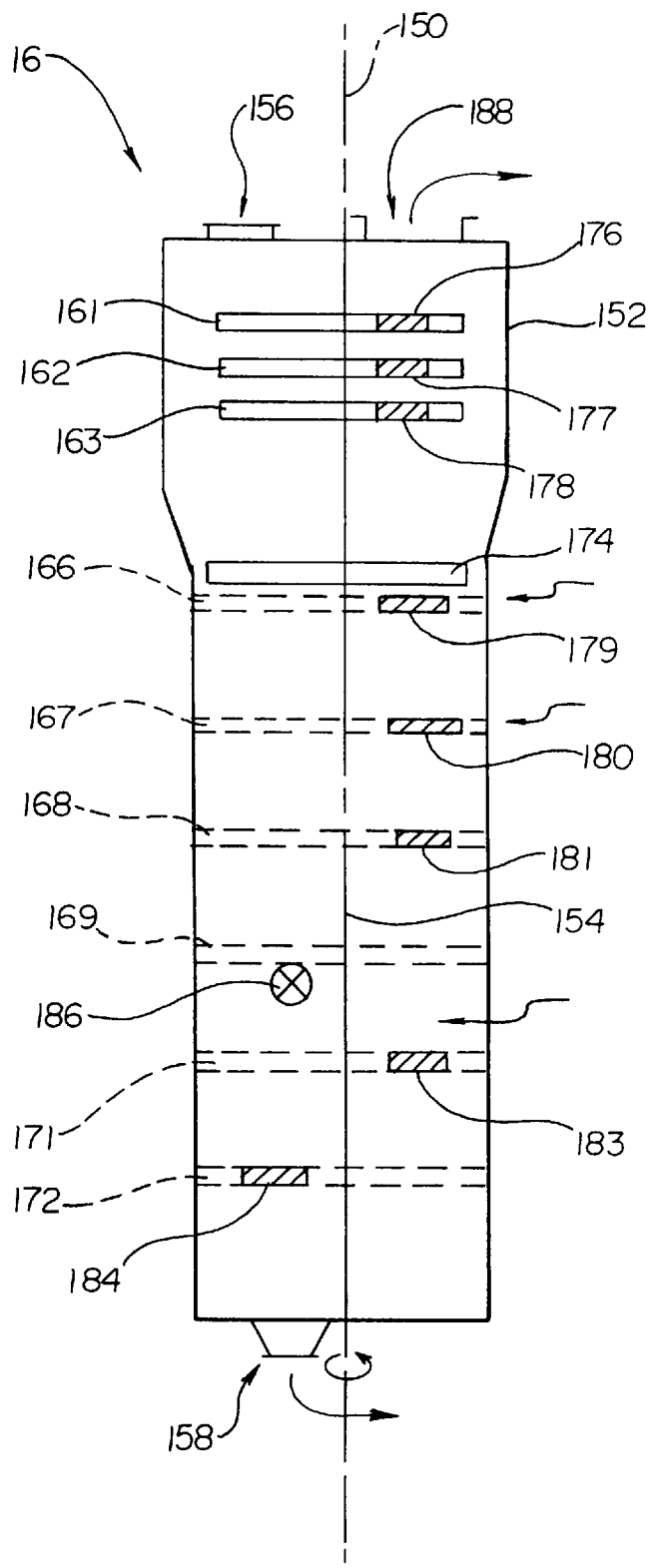
FIG. 5 is a side-view of a desolventizing-toasting-drying-cooling vessel incorporating aspects of the invention.

FIG. 5 is a cross-sectional view of an embodiment of a DTDC 16 along axis 150 incorporating aspects of the invention. DTDC 16 includes housing 152 and a rotatably secured central driveshaft 154. Driveshaft 154 is disposed along axis 150. Wet flakes enter DTDC 16 through inlet 156. Dried flakes, i.e., oil-free meal, exit DTDC 16 through outlet 158. As the flakes pass through DTDC 16, the flakes are sequentially deposited on a plurality of desolventizing trays 161, 162, 163, sparge trays 166, 167, 168, 169, and cooling and drying trays 171, 172 (collectively referred to as trays 173). Sweep arm 174 is secured to driveshaft 154. Although FIG. 5 depicts a single sweep arm 174, it is to be understood that DTDC 16 includes additional sweep arms (not shown) secured to driveshaft 154 in functionally equivalent positions in all trays 173 of DTDC 16. Any modifications that can be applied to sweep arm 174 can be applied to any of the sweep arms used in DTDC 16. Driveshaft 154 rotates clockwise causing sweep arm 174 to reposition the oilseed flakes in sparge tray 166. The flakes eventually fall from one tray to the next tray as the flakes are directed into one of tray drop valves 176, 177, 178, 179, 180, 181, 183, 184. The steam environment surrounding predesolventizing trays 161–163 and sparge trays 166–169 is isolated from the drying and cooling trays 171–172 by isolation rotary valve 186. Excess steam and vaporized solvent exit DTDC 16 through solvent outlet 188 and are transported to distillation apparatus 20 (FIG. 2) where solvent recovery takes place.

Figure 6:
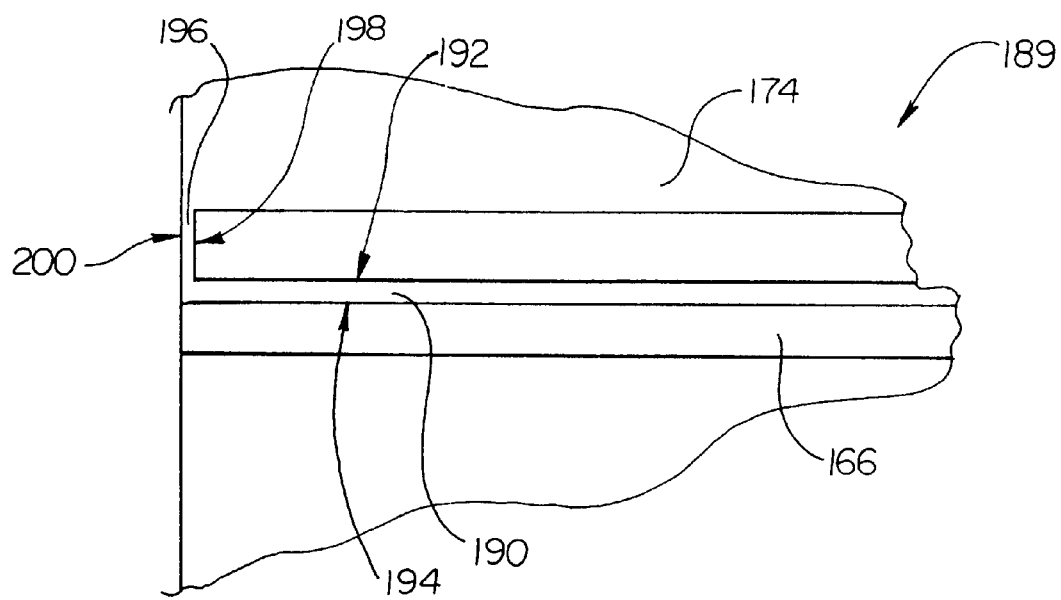
FIG. 6 is side-view of a sweep arm and sparge tray of the desolventizing-toasting-drying-cooling vessel of FIG. 5.

Wet flakes can bind or stick to surfaces within DTDC 16 causing excessive product hang-up, which may lead to excessive product commingling. DTDC 16 is adapted to accommodate a gap in the oilseed flow by minimizing product hang-up. Sweep arms within DTDC 16 have reduced clearances between the sweep arms and DTDC 16 trays 173 to minimize flake hang-up. FIG. 6 is an enlarged side-view of a tray assembly 189 that includes sweep arm 174 and sparge tray 166 of FIG. 5. and illustrates modifications to sweep arm 144 of DTDC 16. Clearance distance 190 between lower edge 192 of sweep arm 174 and bottom surface 194 of sparge tray 166 is reduced by at least about 50% compared to known clearance distances. Clearance distance 196 between outer edge 198 of sweep arm 174 and side surface 200 of sparge tray 166 is reduced by at least about 75% compared to known clearance distances, e.g., clearance distances in a Crown/Schumacher DTDC vessel from Crown Iron Works, Roseville, Minn.

Figure 7:
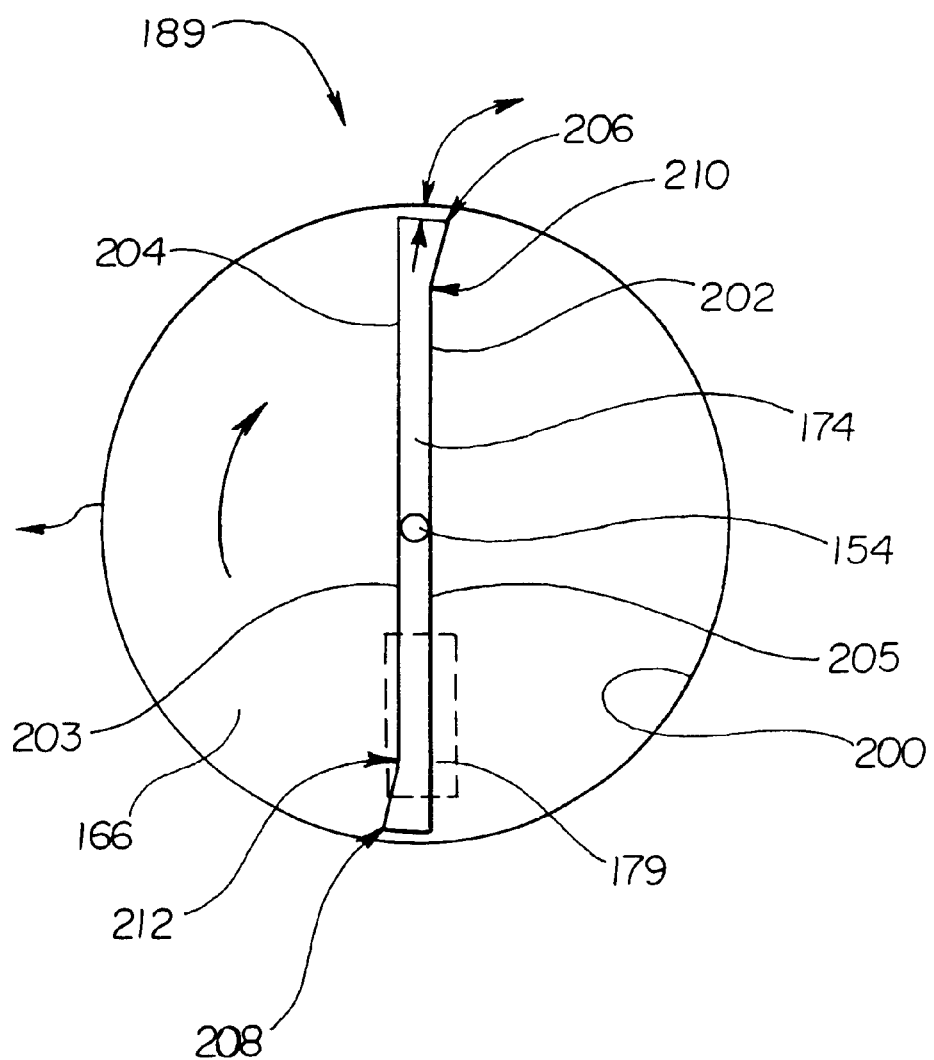
FIG. 7 is a top-view of a sweep arm and sparge tray of the desolventizing-toasting-drying-cooling vessel of FIG. 5.

Sweep arms can be further modified to alleviate flake hang-up. FIG. 7 is a top-view of tray assembly 189 including sweep arm 174 and sparge tray 166 of FIG. 5, modified to alleviate flake hang-up along side surface 200 and bottom surface 194 of sparge tray 166 and each of the respective side and bottom surfaces of trays 173. Sweep arm 174 has leading edges 202, 203 and trailing edges 204, 205. Leading edges 202, 203 are modified to direct flakes towards the center of tray 166. In one embodiment, distal ends 206, 208 of sweep arm 174 are extended on the leading edge 202 and leading edge 203 side. Distal ends 206, 208 of leading edges 202, 203 extend beyond proximal ends 210, 212 of leading edges 202, 203, respectively. As a result, turning sweep arm 174 in a clockwise direction about driveshaft 154 directs flakes towards the center of tray 166 and into tray drop valve 179. Proximal ends 210, 212 of leading edges 202, 203 extension can be disposed adjacent to or coincident with tray drop valve 179. In other embodiments, sweep arm 174 or its leading edges 202, 203 are curved instead of straight. For example, sweep arm 174 can be curved like the blade of a scythe. A curve in sweep arm 144 causes material being pushed by the sweep arm 174 to move towards the center of tray 166 or towards drop valve 179. Pushing material towards the center of tray 174 can facilitate cleaner stock changes of individual trays, minimize material hang-up and maximize yield modifications that can be applied to all sweep arms of DTDC 16. Modifications shown in FIG. 7 can be applied to all sweep arms of DTDC 16.

The number of trays in DTDC 16 can also be altered. For example, the number of desolventizing trays 161, 162, 163 can be increased or decreased. Increasing the number of desolventizing trays can increase the residence time for flakes in DTDC 16 without increasing the exposure time to sparge steam. Increasing the number of desolventizing trays 161, 162, 163 may improve the digestibility of the resulting meal. The number of sparge trays 166, 167, 168, 169 can also be decreased or increased. Altering the number of sparge trays can affect meal quality. The number of drying and cooling trays 171, 172 can also be decreased or increased.

The gap time can be dependent upon the DTDC 16. The gap time period used with extractor 12 typically is selected to be long enough to ensure that at least the first tray of DTDC 16, typically a desolventizing tray such as tray 161, is empty when a second oilseed flake type enters DTDC 16. Preferably, gap time is selected to ensure that two or more trays of DTDC 16 are empty. It is contemplated that gap time lengths computed for extractor 12 and discussed herein above will be long enough to allow for at least one of DTDC 16 trays 173 to be empty so that substantial commingling does not occur. It is to be understood, however, that it may be necessary to lengthen the gap time used in extractor 12 if at least the first DTDC tray is not empty of the first oilseed flakes when the second oilseed flakes enter DTDC 16. The total time needed to empty one or more trays can be easily computed. If the gap time length is less than the period of time needed to completely empty DTDC 16 before second oilseed flakes enter DTDC 16 following a gap, first oilseed flakes, the gap, and second oilseed flakes are present in DTDC 16 concurrently.

Level controllers (not shown) are installed on trays of DTDC 16. These trays can include all tray types in DTDC 16 including trays designated as pre-desolventizing trays, main trays, desolventizing trays, sparge trays, drying trays, cooling trays or sparge steam trays. Level controllers monitor the flake level in trays 173 of DTDC 16. Level controllers can be independent so that the flake level in each tray is monitored. Independent control may also facilitate emptying one or more trays when a subsequent batch of wet flakes enters DTDC 16 following the gap. Independent control is used to minimize mixing of different identity preserved materials. Independent control may also be used to program DTDC 16 so that residence times, desolventizing temperatures, and drying temperatures are optimized for individual oilseed types. Individual level controllers are known and can be electronic devices installed by the manufacturer of DTDC 16. Independent level control of multiple trays may require a plurality of driveshafts 154 within DTDC 16.

Returning to FIG. 2, oil-free meal exiting DTDC 16 is transported via conveyor 8h to meal-sizing equipment 58. It is to be understood that oil-free meal may contain residual oil, typically from about ½% to about 1% measured on a weight percentage basis. Meal-sizing equipment 58 can process the meal to its final size, which is often dictated by its intended use or customer preference. Sized meal is transported by a conveyor 8i to segregated storage bins 18 before the meal is sold and out-loaded from processing plant 2.

Automatic controls are installed to initiate the sequence of steps necessary to establish and maintain the gap throughout plant 2. For example, known sensors are installed to detect the gap such that when the gap reaches extractor 12 the solvent pumps are controlled automatically to prevent the first miscella from contacting the second miscella. Known sensors are installed to detect that gap in DTDC 16 to prevent flakes from a first oilseed from contacting or commingling with flakes from a second oilseed.

To the extent not already indicated, it also will be understood by those of ordinary skill in the art that any one of the various specific embodiments herein described and illustrated may be further modified to incorporate features shown in other of the specific embodiments.

The foregoing detailed description has been provided for a better understanding of the invention only and no unnecessary limitation should be understood therefrom as some modification will be apparent to those skilled in the art without deviating from the spirit and scope of the appended claims.

What is claimed is:

1. A counterflow oilseed extractor comprising:
    a) a plurality of flake receiving stations disposed along a conveyor for transporting oilseed flakes in a direction from a flake inflow port to a flake outflow port;
    b) a plurality of solvent inflow ports oriented to contact said oilseed flakes with a solvent; and c) a plurality of miscella outflow ports oriented to accept a miscella exiting said oilseed flakes, said solvent inflow ports and said miscella outflow ports positioned to transport solvent in a direction opposite the direction of said oilseed flakes, wherein one or more of said plurality of solvent inflow ports and two or more of said plurality of miscella outflow ports are switchable so that said extractor can extract a first oilseed flake type miscella from a first oilseed flake type and a second oilseed flake type miscella from a second oilseed flake type concurrently without substantial commingling of said first oilseed flake type miscella and said second oilseed flake type miscella.

2. The extractor of claim 1 wherein said plurality of solvent inflow ports comprise a first solvent inflow port and a second solvent inflow port, and wherein said plurality of miscella outflow ports comprise a first miscella outflow port and a second miscella outflow port, wherein one of said first miscella outflow port and said second miscella outflow port accept a miscella containing said solvent provided by said first solvent inflow port.

3. The extractor of claim 2 wherein said first miscella outflow port is oriented to accept a miscella containing a solvent provided by said second solvent inflow port, and wherein said second miscella outflow port is oriented to accept a miscella containing a solvent provided by said first solvent inflow port.

4. The extractor of claim 3, said first miscella outflow port disposed proximal to said flake inflow port, said first solvent inflow port disposed proximal to said flake outflow port.

5. The extractor of claim 4, said second miscella outflow port interposed between said first solvent inflow port and said second solvent inflow port.

6. The extractor of claim 5, said second solvent inflow port oriented to provide solvent to about ½ of said oilseed flakes.

7. The extractor of claim 1, said extractor being a countercurrent extractor revolving in the vertical plane, wherein said conveyor has an upper half and a lower half.

8. The extractor of claim 5, said first miscella outflow port being oriented to accept a miscella containing solvent provided by said second solvent inflow port and said second miscella outflow port oriented to accept a miscella containing solvent provided by said first solvent inflow port.

9. The extractor of claim 1 wherein said first miscella outflow port and said second miscella outflow port engage segregated miscella storage tanks.

10. The extractor of claim 7, said first miscella outflow port and said second solvent inflow port disposed along said upper half.

11. A counterflow oilseed extractor comprising:
a) a plurality of flake receiving stations disposed along a conveyor for transporting oilseed flakes in a direction from a flake inflow port to a flake outflow port;
b) a plurality of solvent inflow ports oriented to contact said oilseed flakes with a solvent;
c) a plurality of miscella outflow ports oriented to accept a miscella exiting said oilseed flakes, said solvent inflow ports and said miscella outflow ports positioned to transport solvent in a direction opposite the direction of said oilseed flakes; and
d) a plurality of valves for controlling said plurality of solvent inflow ports and said plurality of said outflow ports, wherein said valves are configured to allow said extractor to extract a first oilseed flake type miscella from a first oilseed flake type and a second oilseed flake type miscella from a second oilseed flake type concurrently without substantial commingling of said first oilseed flake type miscella and said second oilseed flake type miscella.

12. The extractor of claim 11 wherein at least one of said valves are switchable between an open or closed position.

13. The extractor of claim 11 wherein each of said valves are switchable between an open or closed position.

14. The extractor of claim 11 wherein said valves are controlled remotely.

15. The extractor of claim 11 wherein said valves are controlled manually.

16. The extractor of claim 11 wherein said plurality of solvent inflow ports comprise a first solvent inflow port and a second solvent inflow port, and wherein said plurality of miscella outflow ports comprise a first miscella outflow port and a second miscella outflow port, wherein one of said first miscella outflow port and said second miscella outflow port accept a miscella containing said solvent provided by said first solvent inflow port.

17. The extractor of claim 16 wherein said first miscella outflow port is oriented to accept a miscella containing a solvent provided by said second solvent inflow port, and wherein said second miscella outflow port is oriented to accept a miscella containing a solvent provided by said first solvent inflow port.

18. The extractor of claim 17, said first miscella outflow port disposed proximal to said flake inflow port, said first solvent inflow port disposed proximal to said flake outflow port.

19. The extractor of claim 18, said second miscella outflow port interposed between said first solvent inflow port and said second solvent inflow port.

20. The extractor of claim 19, said second solvent inflow port oriented to provide solvent to about ½ of said oilseed flakes.

21. The extractor of claim 11, said extractor being a countercurrent extractor revolving in the vertical plane, wherein said conveyor has an upper half and a lower half.

22. The extractor of claim 19, said first miscella outflow port being oriented to accept a miscella containing solvent provided by said second solvent inflow port and said second miscella outflow port oriented to accept a. miscella containing solvent provided by said first solvent inflow port.

23. The extractor of claim 11 wherein said first miscella outflow port and said second miscella outflow port engage segregated miscella storage tanks.

24. The extractor of claim 21, said first miscella outflow port and said second solvent inflow port disposed along said upper half.

* * * * *

UNITED STATES PATENT AND TRADEMARK OFFICE
CERTIFICATE OF CORRECTION

PATENT NO.   : 6,270,736 B1
DATED        : August 7, 2001
INVENTOR(S)  : Rodney L. Frazier and Warren D. Barnes It is certified that error appears in the above-identified patent and that said Letters Patent is hereby corrected as shown below:

<u>Title page,</u>
Item [56], References Cited, under OTHER PUBLICATIONS, please insert the following: -- Buhler "Buhler Seed Preparation" Product Literature, 8 pages Buhler, "Cascade-Type Magnetic Separator-DFRE" Product Literature, 2 pages Buhler "Cracking Mill-OLCA" Product Literature, 2 pages Buhler "Crushing Mill-DOZH" Product Literature, 2 pages Buhler "Cyclone Separator-MGXD" Product Literature, 2 pages Buhler "Cyclone Separator-PAZ" Product Literature, 2 pages Buhler "En-Masse Conveyors & Elevators" Product Literature, 6 pages Buhler "Expander-UXCE 220/2420" Product Literature, 2 pages Buhler "Flaking Mill-ALFLA" Product Literature, 2 pages Buhler, "Flaking Mill-DOQB" Product Literature, 2 pages Buhler Flaking Roller Mill-DOZC" Product Literature, 2 pages Buhler, "Fluid-Bed Dryer/Cooler-OTW-Z" Product Literature, 2 pages Buhler "Four-Roller Break Mill-DOZD" Product Literature, 2 pages Buhler "Grain Separator Granostar-MTMA" Product Literature, 4 pages Buhler "Hammer Mill Zinal-DFZC" Product Literature, 2 pages Buhler "MTSC Destoner With or Without Air-Recycling System for the Continuous Separation of Stones From a Stream Granular Material" Product Literature-MTSC, MTSC-U, 4 pages Buhler "Oscillating Sieve-DFTA-13/-23" Product Literature, 2 pages Buhler "Rotary Airlocks" Product Literature, 6 pages

UNITED STATES PATENT AND TRADEMARK OFFICE
CERTIFICATE OF CORRECTION

PATENT NO. : 6,270,736 B1
DATED : August 7, 2001
INVENTOR(S) : Rodney L. Frazier and Warren D. Barnes It is certified that error appears in the above-identified patent and that said Letters Patent is hereby corrected as shown below:

Buhler "Rotary Magnet-DFRA" Product Literature, 2 pages

Buhler "Round Sieve-DFTD" Product Literature, 2 pages

Buhler "Rundsichter Round Aspirator Separador cilindrico-DSTA" Product Literature, 2 pages Buhler "Soya Processing" Product Literature, 8 pages Buhler "Spout Magnet-DFRD" Product Literature, 2 pages Buhler "TUBEX" Electronic Weighing System for In-Plant Product Checking-MWBL-EE" Product Literature, 4 pages Buhler "UXFR 1000 -- SC Commercial Conveyors" Product Literature, 2 pages Buhler "UXFR 2000 Conveyors" Product Literature, 2 pages Buhler "UXFR 2000 Eleveyors" Product Literature, 2 pages Buhler Inc. "Vegetable Oils and Fats Delicacies of Nature" Product Literature, 12 pages Buhler "Vertica, Vertical Rotor Mill-DFZH-1" Product Literature, 2 pages Buhler "Verticle Rotor Mill, Vertica-DFZH-2" Product Literature, 2 pages Signed and Sealed this Eighteenth Day of June, 2002

*Attest:*

*Attesting Officer*

JAMES E. ROGAN
*Director of the United States Patent and Trademark Office*